United States Patent [19]

Yekutieli

[11] 4,146,784

[45] Mar. 27, 1979

[54] SUN TRACKING DEVICE

[75] Inventor: Gideon Yekutieli, Rehovot, Israel

[73] Assignee: Yeda Research & Development Co., Ltd., Rehovot, Israel

[21] Appl. No.: 755,739

[22] Filed: Dec. 30, 1976

[30] Foreign Application Priority Data

Jan. 8, 1976 [IL] Israel ........................................ 48809

[51] Int. Cl.² .......................... G01B 11/26; G01J 1/20
[52] U.S. Cl. ................................................ 250/203 R
[58] Field of Search ..................................... 250/203 R

[56] References Cited

U.S. PATENT DOCUMENTS

| 3,780,966 | 12/1973 | Newcomb et al. | 250/203 RX |
| 4,013,885 | 3/1977 | Blitz | 250/203 R |
| 4,018,532 | 4/1977 | Fletcher et al. | 250/203 R X |

Primary Examiner—Palmer C. Demeo
Attorney, Agent, or Firm—Ostrolenk, Faber, Gerb & Soffen

[57] ABSTRACT

A sensor for detecting the position of the sun in the sky and for use in systems adapted to track the movement of the sun in the sky, said sensor comprising a housing provided with a predetermined opening in the vertical and in the horizontal directions, a member having a reflecting surface at least part of which is of spherical shape, a photosensor adapted to provide an electrical signal when illuminated by rays of the sun reflected from said member with spherical surface, said photosensor being located in said housing or in a separate housing, said element with spherical surface being positioned so that rays of the sun entering said opening are reflected onto said photosensor, means being provided to utilize the resulting signal for locking onto the sun and for tracking its movement; systems for such tracking comprising a plurality of such sensors and means for tracking the sun by equalization of the signals obtained from at least two sensors, each covering a predetermined part of the sky.

16 Claims, 10 Drawing Figures

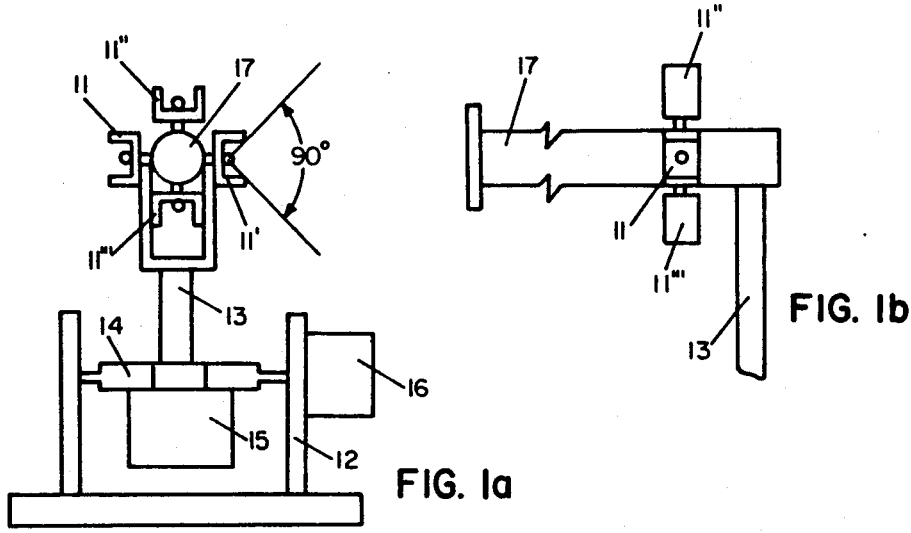
FIG. 1a
FIG. 1b
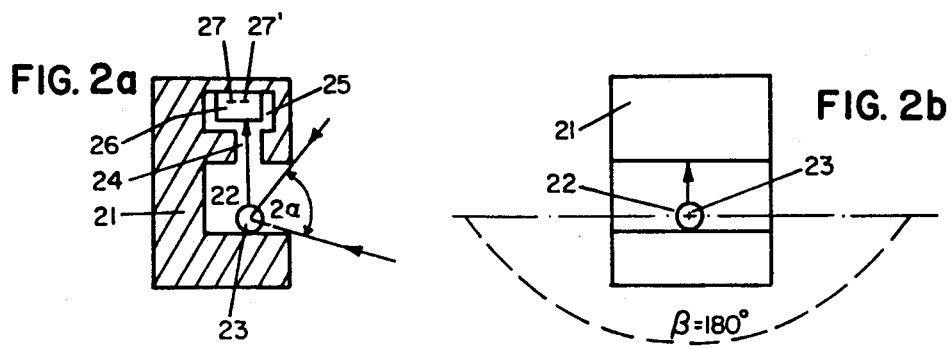
FIG. 2a
FIG. 2b
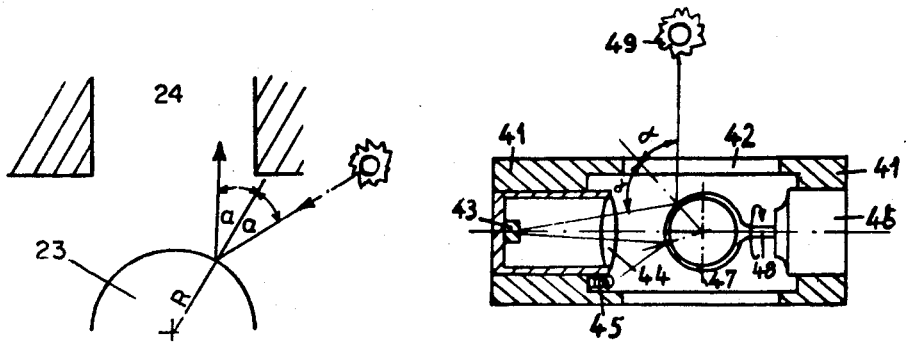
FIG. 3
FIG. 4

SUN TRACKING DEVICE

FIELD OF INVENTION

The present invention relates to a novel detector designed and adapted to perceive and identify the sun in the sky. The invention relates also to a sun-tracking device comprising in combination a plurality of the novel detectors, tracking circuit and servo means, adapted to accurately lock on the position of the sun in the sky and to hold the system on the sun. The novel tracking system is of use in conjunction with various devices utilizing concentrated solar energy, which can thus be continuously operated at an optimum efficiency. Such devices are mainly optical devices whereby the solar energy incident on a certain area is concentrated and directed on suitable conversion means.

The novel detector comprises in combination a substantially spherical reflecting member, or reflecting member having at least a part of a sphere as part of its surface such as a ring shaped member rotating about its axis, located in an opaque housing, there being provided a window defining a predetermined observation angle of the said sphere or spherical member, a photo-sensing means being located in said housing or separated therefrom adapted to detect and react to the rays of the sun reflected on same from spherical member.

The novel detector and the tracking device are comparatively simple and inexpensive. The system can be constructed from readily available conventional components, and it is both selective and reliable.

Other and further aspects of the invention will become apparent from the following detailed description.

BACKGROUND OF THE INVENTION

Many devices for the utilization of solar energy, and especially devices of this type wherein an optical element is used for focusing solar energy onto a certain member adapted to convert the said energy to electrical current, or the like, depend to a large extent on efficient and comparatively inexpensive means for locating and for continuously tracking the sun in the sky.

STATE OF THE PRIOR ART

The accurate tracking of the sun and of other celestial objects is generally achieved by the "light-spot-method". The detector used comprises a long focal length lens with a quadrant of photo-sensors in the focal plane. It is one of the drawbacks of this type of tracking instruments that the detector "sees" only a small part of the sky at any position, and thus a special procedure has to be resorted to for finding the sun in the morning when it rises, and for finding it again whenever the detector loses it due to some cloud or the like. Furthermore, such devices are rather complicated and expensive and thus they are not adapted for large-scale use as tracking components for concentrating solar radiation for the economical utilization of solar energy.

SUMMARY OF THE INVENTION

The invention relates to a novel detector adapted to perceive and identify the sun in the sky. The novel detector according to the present invention is based on the reflection of rays from the sun by means of a member having a surface which comprises at least a part of a sphere onto a shaded photo-sensor, positioned in a suitable opaque housing, said spherical member being positioned in said opaque housing so as to "perceive" a certain predetermined part of the sky. The part of the sky seen by the said spherical member depends on the angle of the opening in the lateral and vertical directions. It is suitable to make use of a combination of different detectors, having different "windows". The most simple spherical member is a metallic reflecting sphere, as such as a small metallic sphere from a ball-bearing. A similar effect can be obtained by using a spherical hole in a transparent material, such as glass or methyl-methacrylate, where the ray is reflected by such inner surface in the desired direction. A rotating ring, or a rotating ring only half of which has a reflecting surface, can also be used in a sensing element according to the present invention. According to a preferred embodiment such rotating ring is used in conjunction with a light source, such as a small incandescent lamp, the reflection of which by the said rotating ring provides a reference plane for the determination of the position of the sky respective such plane.

According to yet a further embodiment of the invention, there is utilized as detecting element a spherical member or half a sphere, adapted to reflect the rays of the sun, the photosensor being located inside a telescope which is positioned at a predetermined distance from said reflecting member.

It is of course possible to use other members having on their surface at least part of a sphere or which have an opening (in transparent material) which has at least part of its surface in the form of a spherical shape, or of a similar body of rotation or part thereof adapted to result in the desired reflection or deflection of the sun rays. There may be used a plurality of spherical holes or a suitable arrangement of a plurality of reflecting surfaces giving a similar optical result. It is clear that when a spherical member is used, the material thereof is of no importance, as only the reflectivity of its surface is used. If a member with a suitable hole is used, a suitable surface giving a total reflection is to be used. Good results were obtained with spheres from ball-bearings of about 1.0 to 3.0 mm diameter; diameter is not critical. The rays of the sun reach the sphere through a window defining a predetermined angle, and windows as large as a quarter of a sphere can be used. With such windows, a combination of four such detectors covers the entire sky. The sun rays reflected from the sphere are reflected onto a photo-sensor and this actuates a conventional circuit so as to track and "hold" the sun as long as the rays of it reach the sphere.

According to another embodiment the rotating ring is located in a housing wherein it is surrounded by a transparent cylindrical sleeve, thus defining in one direction an angle of 360°, and in the other direction an angle of desired size, such as for example 90°. A device of this type is equivalent in its performance to that of two individual devices containing a spherical member and having an opening of 180° in one direction, and one of about 90° in the other.

According to a preferred embodiment, there is used as the reflecting element a rotating ring-shaped member the surface of which is adapted to reflect the rays of the sun. There may also be used half a ring, giving one signal per rotation. The ring shaped element is rotated at a given frequency, and during each rotation it provides one signal if half a ring is used, and two signals when a complete ring is used, resulting from the rays of the sun. This is reflected onto a photosensor. As the ring may be made quite narrow (for example about ½°) which corresponds to the "size" of the sun in the sky, the ratio of signal to background illumination and thus the resolving power is much better than with a spherical element.

The tracking of the sun and the construction of devices for concentrating the rays of the sun onto a given target will be explained in greater detail hereinafter.

The novel detectors according to the present invention are advantageously used as key components of a sun tracking device. Such a device comprises a plurality of the novel detectors. A simple tracking device adapted to cover the entire sky comprises four detectors according to the invention each containing an entire sphere or half a sphere, in combination with servo controls and the necessary circuits. Such sun tracking system according to the invention comprises according to a preferred embodiment four detectors arranged around a common arm, each being able to cover a predetermined part of the sky equivalent to about a quarter of a sphere, means being provided for moving a platform on which the entire device is mounted; the platform making possible a movement about two predetermined perpendicular areas. When the sun is in the sky the device will find it, point its arm towards the sun and lock on it, moving so as to "hold" it as long as it is in the sky and as long as it is not covered by any object (cloud or the like). When the sun disappears the tracking ceases automatically, and when the sun reappears, the system aligns itself so as to lock on it and to hold this position, moving with the sun.

The invention is illustrated with reference to the enclosed schematical drawings, which are not according to scale and in which:

FIG. 1-$a$ is a schematic front view of a tracking device according to the invention;

FIG. 1-$b$ is a detail of FIG. 1-$a$ showing the arm of the device in a side view;

FIG. 2-$a$ is a vertical cross-section through a detector according to the invention;

FIG. 2-$b$ is a front view of the detector of FIG. 2-$a$;

FIG. 3 illustrates the path of rays from the sphere of the detector shown in FIG. 2 onto the photo-sensor inside the housing;

FIG. 4 is a schematical cross-sectional view through another embodiment of a detector according to the invention;

DESCRIPTION OF THE PREFERRED EMBODIMENTS

Figure 5:
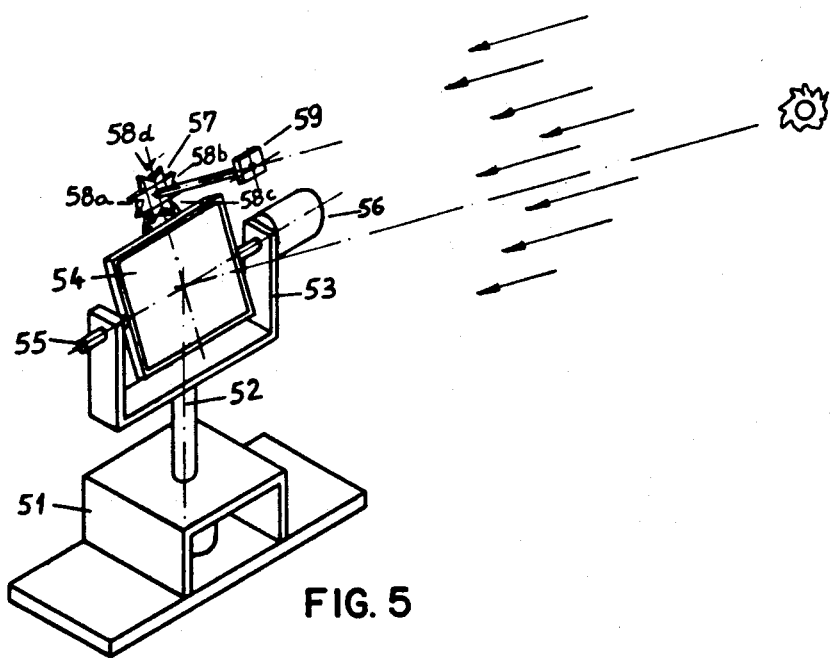
FIG. 5 is a perspective view of a sun-tracking device according to the invention.

As shown in FIGS. 2-$a$ and 2-$b$, the novel detector for the detection of the position of the sun in the sky comprises a housing 21, made of an opaque material provided with a window 22, defining an opening of angle 2$\alpha$ (FIG. 2-$a$) in the vertical direction, and open towards the two sides so as to define an angle of $\beta \approx 180°$, as shown in FIG. 2-$b$, which is a front view of the device of FIG. 2. In the window 22 there is positioned a reflecting sphere 23 advantageously made of polished metal, such as a sphere of a ball bearing. The sphere used in an experimental device was of 1.5 mm diameter. From the channel defining the window 22 there extends upwards a cylindrical channel 24, which widens at its upper part to form a larger open space 25 in which there is positioned a photo-sensor 26, the active surface of which faces the spherical member 23. The photo-sensor 26 is shielded from stray light and only light entering through the window 22 can enter and reach the sensor. As shown in FIG. 2-$a$, rays of the sun, coming in at any angle within that defined by the opening of the window, will be reflected onto the photo-sensor 26. The opening angles are calculated with respect to the sphere 23. An opening of 90° in the vertical plane, and an opening of 180° in the horizontal plane can be resorted to. As shown in FIG. 3, sun rays are reflected from the sphere 23, and the observer (in this case the photo-sensor) sees the sun rays reflected at 2$\alpha$ degrees from the surface of the sphere. At the reflection point the normal to the surface makes an angle $\alpha$ to the direction of the observer. Thus, wherever the sun will be located in the sky with respect to the observer, the observer will see the reflection of the sun from some point in the upper half of the reflecting sphere. The amount of light reflected from the sphere is $$I.p.R^2 \cos(\alpha)\omega,$$

where I is the intensity of the sun light incident per unit area, p and R are the surface reflectivity and the radius of the sphere, respectively, and $\omega$ is the angular aperture of the observer.

The sun is by far the most intense natural light source seen on earth. By choosing a combination of a suitable small reflecting sphere and a matching photo-sensor, it is possible to obtain a system which will preferably react to sunrays reflected by the said sphere, and thus the detector according to the present invention will receive and react more intensely to incident sunrays then to diffuse light. The opaque housing blocks out part of the field of view, and thus the detector will "see" only a part of the sky defined by the window. This can be 180° in the horizontal direction and up to about 90° in the vertical direction. The leads 27 and 27' from the photo-sensor 26 are connected to a conventional tracking circuit. In the experimental model a photo transistor (MRD 14B, Motorola) was connected to a resistor of 10Ω in series and a voltage of 10 V was applied. When sunrays on a clear day fall on the reflecting sphere, the photo transistor is saturated and a voltage of about 8.8 V was measured on the resistor. When the sphere was not thus illuminated, there was practically no voltage on the resistor.

A sun-tracking and holding system according to a preferred embodiment of the present invention comprises four detection devices of the type described above, positioned around a common arm so as to cover the entire sky. A system of this type is illustrated with reference to FIGS. 1-$a$ & 1-$b$, wherein 11, 11', 11" and 11''' are the said four detectors. Each of these has openings of 180° and 90°, respectively in the two perpendicular directions. Two of the detectors 11 and 11' face and "see" left and right, while the other 11" and 11''' "see" up and down, respectively. The detectors are mounted on a platform 12, having an axis 13 allowing for movement in the left/right direction, and an axis 14, allowing for movement in the up/down direction, two electrical motors 15 and 16 actuating respectively the movements of the axes 13 and 14. The motors 15 and 16 are actuated according to current supplied according to the output of the tracking system, as will be explained in the following:

The left/right detectors control the left/right motion through a servo system whereas the up/down couple controls the up/down motion. When the sun is in the sky above the horizon in any location, the system will find the sun, lock on it and track it accurately until the sun disappears by setting or behind a cloud. When the sun reappears, the system will automatically find it and track it again.

Figure 10:
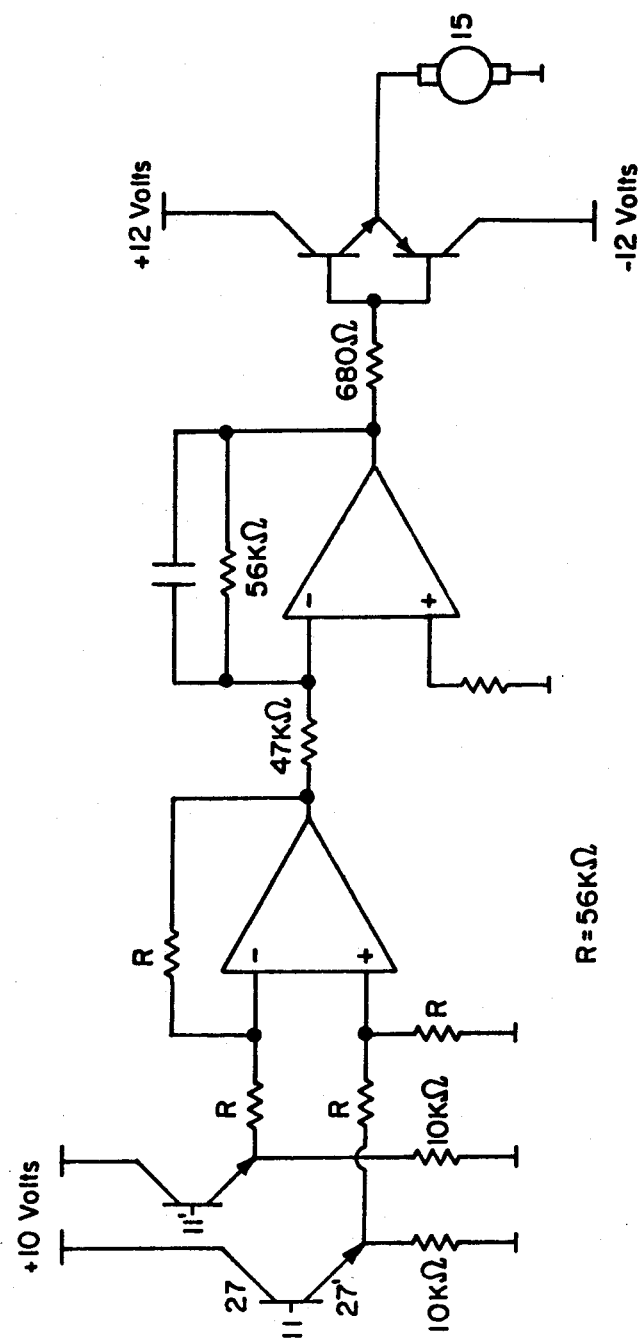
FIG. 10 is a schematical wiring diagram of a conventional electronic circuit used for the actuation of servo-motors adapted to move the sensors with the arms of the device to which they are attached, of the type shown in FIG. 1, one such circuit being used for each pair of sensors.

The pair of left/right solar detectors can be mounted on a polar axis, i.e., an axis parallel to the axis of rotation of the earth, and this can be used to track the daily motion of the sun. This can be easily attained by turning the system of FIG. 1 so that the left/right axis becomes a polar axis. In autumn and in spring the direction of the sun is perpendicular to the polar axis; in summer and winter its elevation changes up and down by 23.5°, respectively this axis. Thus the sun can be seen throughout the entire year by at least one of these two detectors. The pair of left/right detectors is used to track the sun and these control the left/right motion through a conventional closed loop tracking circuit (see FIG. 10). This arrangement is such that when the sun is seen by only one of the detectors, say the right-hand one, the photo-sensor of this detector will induce a current in the control circuit, and this will actuate the servo control to drive the device around the axis until both the left and right detectors see the sun equally well, i.e. that the intensity of the sunrays perceived by the respective photo-sensors of these will be equal. The daily and seasonal tracking of the sun is effected by the added pair of up-and-down detectors, mounted on their axis and actuated by the motor. The operation of these is similar to that of the other pair, and the two pairs are thus adapted to accurately locate and lock on the sun and track it continuously.

An improvement of the accuracy can be achieved by attaching a shadowing arm 17 bearing a disk-shaped member 18 having a radius equal to that defined by the circle passing through the centers of the spherical elements of the detectors 11 to 11''' perpendicular to the axis between the four said detectors. When this shadowing arm points towards the sun, both detectors of each of the pairs sees the sun equally well, and the intensity of electrical current from each of these will be equal. Any deviation of the position of the sun respective the device results in the casting of a shadow of the said disk on at least one of the spherical elements of the said detectors, and this results in a corrective movement which will continue until again all four elements are illuminated with equal intensity. The angular accuracy of the system is proportional to R/L, where R is the radius of one of the reflective spheres and L is the length of the shadowing arm 17.

FIG. 3 illustrates the reflection of the rays of the sun having an angle of incidence α, by means of the spherical member 23, at an equal angle α', into the housing 21, and onto the photo-sensor which is not shown in this Figure.

A different embodiment of a detector, according to the present invention, is illustrated with reference to FIG. 4, an element which is equal to two elements of the kind shown in FIG. 2-a and 2-b.

The detector illustrated in FIG. 4 comprises a housing 41 made of opaque material which is provided with a cylindrical transparent window 42, which provides an angle around the circumference of 360° and an opening angle in the other direction of a desired size, for example about 90°; in the left-hand side of the said housing 41 there is positioned a photo-sensor 43, connected to the outside by suitable conductive means, not shown in the figure. In front of the said photo-sensor 43, there is provided a focusing lens 44 and in a small recess below this lens there is provided a miniature incandescent lamp 45. On the right-hand side of the device there is provided a small electromotor 46, adapted to rotate a ring-shaped member 47, having a reflecting surface about the axis of rotation 48. The sun is shown as 49. While the ring-shaped member 47 rotates about the axis, it will give at a certain position a signal due to its being illuminated by the rays of the small lamp 45, and this defines a reference plane. While the said element continues to rotate, it will at a certain position reflect rays of the sun 49 via lens 44 onto the photo-sensor 43. As the ring-shaped member can be made quite narrow, the ratio of signal to background illumination is much better in this case than with a reflecting sphere. The relative position of the plane defined by the lamp respective the one at which the said ring is located when it reflects rays of the sun onto the photo-sensor defines in an accurate manner the position of the sun in the sky. Two such elements with their axes of rotation perpendicular to each other, arranged on a suitable frame means define a scanning device adapted to search for and locate the sun in the sky and to maintain an efficient tracking of the sun. The angle of the sun is about ½° and when the width of the ring-shaped element 47 is of a suitable width a maximum of ratio of signal versus background illumination is obtained. The lamp provides a reference signal every 180° of rotation, and the difference between this position and that of the pulse resulting from the sun can be used for the adjustment of the device wherein such element is used to fix itself in the direction of the sun by equating the phase difference between successive pulses.

If only half the ring-shaped member has a reflecting surface or when only half a ring is used in each complete rotation of said member there will be obtained only one reflection of the lamp and one of the sun. When the phase difference is less than 180°, a command is given to turn the device until it will be positioned in a given plane where the phase difference is exactly 180°, and thus faces directly in the direction of the sun.

A sun-tracking device adapted to rotate continuously the plane of a solar collector or concentrator, perpendicular to the direction of the sun in the sky is illustrated with reference to FIG. 5 which comprises a suitable support 51, supporting member 52, adapted to rotate around a vertical axis, a frame member 53 which latter supports a solar collector or concentrator(such as a Fresnel lens) 54 adapted to be rotated around the axis 55 by means of actuating means 56. In the plane of the solar collector or concentrator 54 and attached thereto, there is provided a tracking element 57 comprising four tracking devices 58-a, 58-b, 58-c and 58-d of the type shown in FIG. 2, each of these covering a predetermined segment of the sky. The elements 58-a and 58-b define the azimuthal axis whereas the tracking devices 58-c and 58-d are arranged in the elevational axis. Preferably, there is provided a shading element 59, the shade of which is just of the size to shade part of the spherical elements of the four tracking devices. When the signals originating from each of the pairs 58-a and 58-b and of 58-c and 58-d are made to be equal, the solar collector will be directed perpendicular the direction of the sun in the sky.

Figure 6:
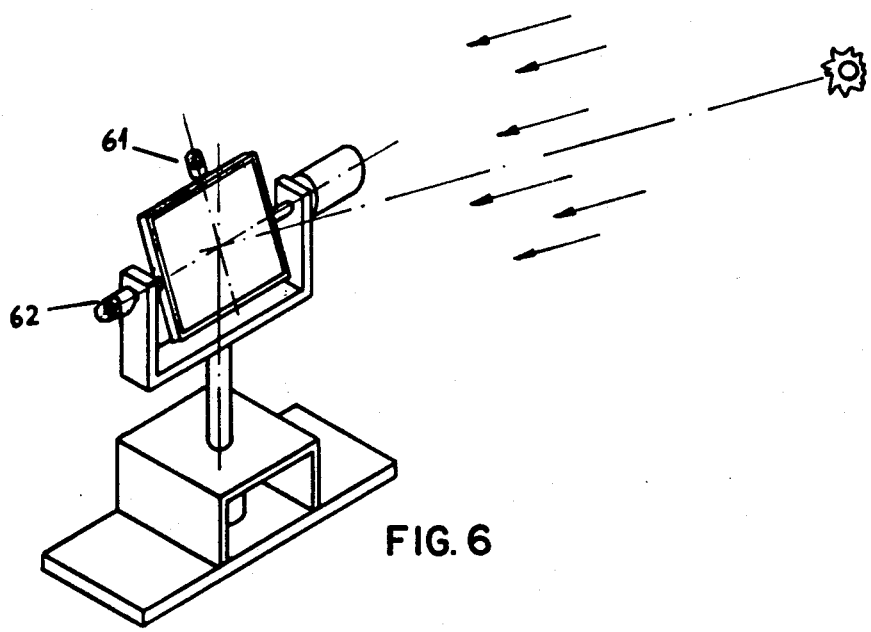
FIG. 6 is a perspective view of another sun-tracking device according to the invention.

A similar arrangement is illustrated with reference to FIG. 6, where the parts are identical, except for the tracking means which comprise detectors 61 and 62 of the type shown in FIG. 4. One of these, 61, effects the sensing in the azimuthal axis; the other, 62, in the elevational axis. These cover a segment of the sky of 360° and 90°; and 90° and 360° respectively.

Figure 7:
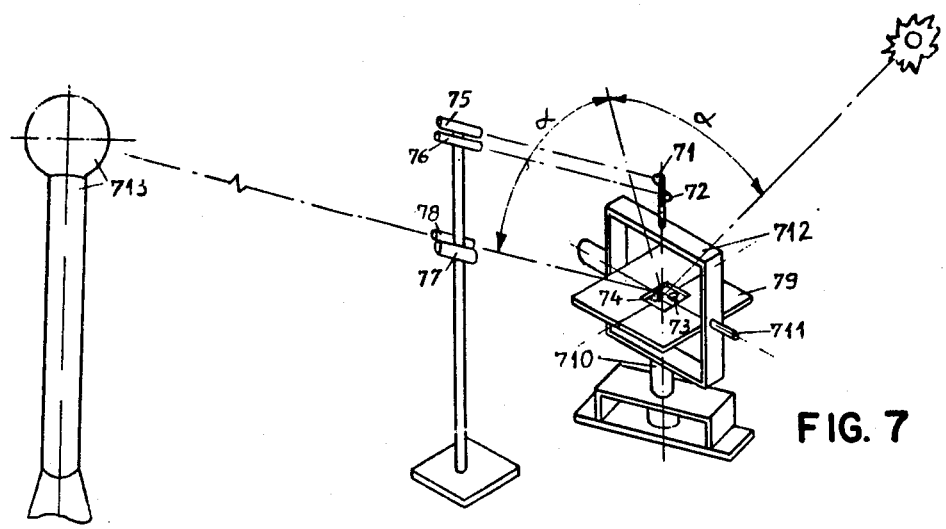
FIG. 7 is a perspective view of a sun-tracking device adapted to reflect the rays of the sun onto a given target.

FIG. 7 illustrates the use of four sensing elements—71, 72, 73 and 74—each of these being of the type having one reflecting element of half a sphere, each of these being coordinated with a telescope—75, 76, 77 and 78, respectively—and a suitable sensor, positioned inside the respective telescope. Each telescope is positioned so that its axis is on a straight line between its respective half sphere and the top of the tower. The light reflected from the half spheres is reflected so as to be directed into the telescope. When only one of the half spherical elements of a given pair "sees" the sun, it actuates means adapted to rotate first the mirror 79 about the axis 710 and then about the axis 711, respectively, said mirror 79 being held in the frame 712, the resulting movement being continued until each of the reflecting elements of each pair "sees" the sun in an equal manner. The telescopes and the tower 713 are in a fixed position, and by means of the sensing and actuating elements it is possible to change the position of the mirror so that it will reflect the rays of the sun onto the top of the tower 713 as long as the sun shines and reaches the sensing elements. When the sun is covered by a cloud, the elements will be at rest, and when it reappears, the said device will immediately equate the illumination of each of the half-spheres so that the light of the sun will again be directed onto the top of the tower 713. This arrangement differs in that the half-spherical reflecting element is separate from the photosensor which is located in the respective telescope.

Figure 8:
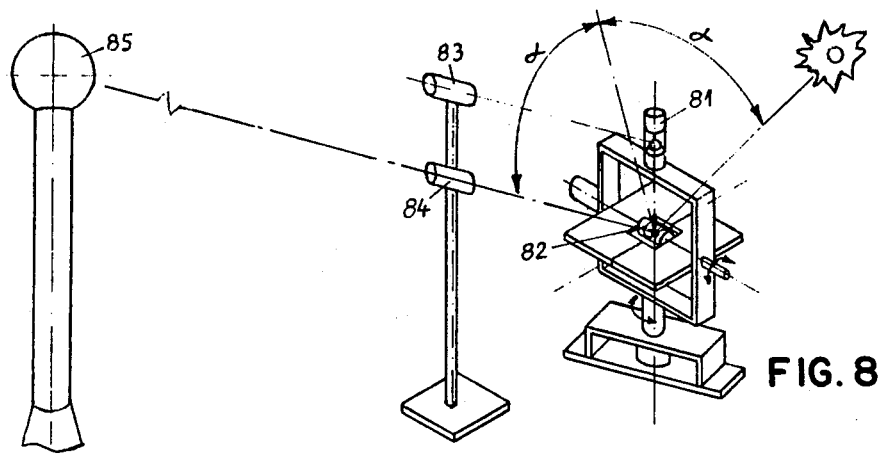
FIG. 8 is a perspective view of another embodiment of a sun-tracking device adapted to reflect the rays of the sun onto a predetermined target.

FIG. 8 illustrates an arrangement similar to that of FIG. 7, but here there are provided two sensing elements: one 81 is on the azimuthal axis and the other 82 is on the elevational axis. Each of the said elements has a reflecting rotating ring and a reference lamp as in the detector described in FIG. 4. However, in this arrangement the reflected sunrays of each element is detected by its respective telescopes, 83 and 84, as explained in FIG. 9. This arrangement comprises two telescopes, 83 and 84. Each of these are in a fixed position, pointing with their axes towards the top of the tower 85.

Figure 9:
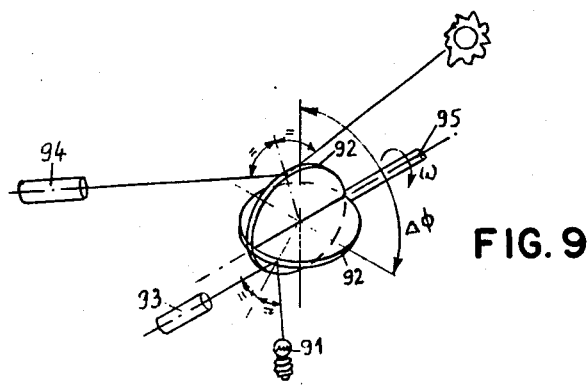
FIG. 9 is a detail of a detector used in the sun-tracking device of FIG. 8.

FIG. 9 illustrates the reflection of the rays of the sun and of the reference lamp 91 by means of the rotating ring-shaped element 92, shown in two positions at an angle of $\Delta\phi°$ with each other. The light of the lamp 91 is reflected from the reflecting surface of the element 92 via telescope 93, whereas the rays of the sun are reflected via telescope 94 at the other angle shown. The angle $\Delta\phi$ between these defines the position of the sun respective the reference plane defined by the reflection of the light of the lamp. The rotation is about the axis 95 by means of a suitable actuating element which is not shown.

PERFORMANCE OF THE SYSTEM

The complete daily and seasonal sun-tracking and scanning device was built, and its performance was tested. Small steel balls of 1.5 mm diameter and silicon photo transistors (MRD 14B Motorola) were used for the four directional solar detectors. Two 12 Volts 0.2 watts reversible Haydon D.C. motors were used to drive the device. The device followed the sun from sunrise to sunset with an accuracy better than ¼ of degree. The accuracy was increased when the length of the shadowing arm was increased. During the night the device was pointing to the position where the sun set. The next morning the east detector "saw" the sun, and the device moved eastward until the shadowing arm pointed again towards the sun and continued to follow it. When a cloud covered the sun, the system stopped until the sun reappeared and was "seen", whereupon tracking was resumed. The system is very simple, reliable, and inexpensive. Its power economy is very good. The two motors are active only when the sunrays fall on the system with a nominal intensity. The motors are much faster than the motion of the sun, and they work only a small fraction of the day. The circuits of the two pairs of detectors are always active, but they are transistorized and consume very little power.

As set out above the basic unit of a system to be used with a tracking system according to the present invention comprises a suitable lens and a solar cell (or a plurality of lenses and solar cells), mounted on a frame so that when the sunlight falls on the lens parallel to its optical axis, the concentrated sunlight (i.e. the image of the sun) falls on the solar cell. The best utilization is achieved when the said image covers substantially the entire area of the solar cell. In view of this it is clear that it is important to maintain the system in such a position that the axis of the lens is parallel to the sunrays. This is easily attained by resorting to an arrangement very similar to that of the tracking system of the invention. For example, there may be attached to the left/right axis one or more lens and solar cell or cells, moving with said tracking system. Thus, when the tracking system is locked on the position of the sun in the sky, the sunlight will always fall on the lens/solar cell combinations so that such maximum utilization is achieved.

I claim:
1. A device for detecting the position of the sun in the sky, comprising in combination:
   (a) an opaque housing;
   (b) a photosensor located within said opaque housing;
   (c) a reflector member disposed in said housing and having an at least partly positively curved shape positioned relative to said photosensor such that rays of the sun striking it will be reflected onto said photosensor;
   (d) an opening in said opaque housing that together with said reflector member defines a minimum solid angle of between $\pi$ and $2\pi$ steradians; and
   (e) circuit means connected to said photosensor for utilizing the output of said photosensor.

2. The device of claim 1, wherein said reflector member is a metal sphere.

3. The device of claim 1, wherein said opening is a cylindrically shaped opening.

4. The device of claim 1, wherein said reflector member is a thin at least partly ring-shaped element having an axis of rotation which is perpendicular to the axis thereof, and means connected to said ring-shaped element for rotating said ring-shaped element about its axis at a predetermined frequency.

5. The device of claim 4, which further includes a fixed reference light source in said opaque housing, said reference light source being directed toward said ring-shaped element to provide a signal light reflected from said ring-shaped element thereby to establish a reference plane.

6. The device of claim 4, wherein the width of said ring-shaped element forms approximately 0.5° angle with respect to its axis.

7. A device for detecting the position of the sun in the sky, comprising in combination:
  (a) an opaque housing;
  (b) a reflector member having an at least partly positively curved shape positioned in said opaque housing so that rays of the sun are reflected thereby;
  (c) an opening in said opaque housing that together with said reflector member defines a solid angle of $2\pi$ steradians;
  (d) a second opaque housing spaced from said opaque housing and having a narrow opening;
  (e) a photosensor located within said second opaque housing and positioned such that the rays of the sun striking said reflector member are reflected onto said photosensor; and
  (f) circuit means connected to said photosensor for utilizing the output of said photosensor.

8. A device for detecting the position of the sun in the sky, comprising in combination:
  (a) first and second reflector members, each in the shape of a half-sphere and having a convex spherical surface and a back surface, the back surfaces of said first and second reflector members being parallel to each other, the convex spherical surfaces of said first and second reflector members facing in opposite directions;
  (b) a stand supporting said first and second reflector members;
  (c) first and second opaque housings each located at a given distance from said first and second reflector members; said first and second opaque housings each having a respective narrow opening which face given different but contiguous solid angles of the sky;
  (d) a first photosensor positioned within said first opaque housing such that the rays of the sun striking said first reflector member are reflected onto said first photosensor;
  (e) a second photosensor positioned within said second opaque housing such that rays of the sun striking said second reflector member are reflected onto said second photosensor; and
  (f) circuit means connected to said first and second photosensors for utilizing the output of the photosensors.

9. A system for tracking the movement of the sun in the sky, comprising:
  (a) a central arm;
  (b) a square plate located upon said central arm and lying in a plane which is perpendicular to said central arm;
  (c) four directional sun sensors arranged in a plane spaced from and parallel to said plate and disposed at locations corresponding to the four corners of said square plate; said sensors each pointing away from said central arm and covering given respective sections of the sky; and
  (d) means for moving said central arm and said sensors in a manner to equalize the intensity of illumination striking given pairs of said four sensors.

10. The system of claim 9, wherein a second arm is provided perpendicular to said central arm, said second arm having located at its extremity an element adapted in size and shape to shade an area equal in radius to the radius defined by the area of the four reflector members of said four sensors.

11. The system of claim 9, which includes a closed loop tracking circuit and servo motor for controlling the movement of each of said pair of opposite sensors and of the said central arm to which said sensors are attached.

12. A system for tracking the sun in the sky, comprising:
  (a) a two-axis sun tracker;
  (b) a first arm along the horizontal axis of said two-axis sun tracker;
  (c) a second arm along the vertical axis of said two-axis sun tracker;
  (d) a first directionally sensitive sun sensor means mounted upon said first arm and having a rotating reflector member rotating around a first axis;
  (e) a second directionally sensitive sun sensor means mounted upon said second arm and having a rotating reflector member rotating around said second axis perpendicular to said first axis;
  (f) circuit means connected to said first and second sensor means provided to utilize the combined output of said first and second sensor means to locate the sun in the sky and track its movement.

13. The system of claim 12, wherein the reflecting member is a ring-shaped element which is rotated about a line in the plane of said ring-shaped element at a constant frequency.

14. The system of claim 13, wherein a reference light source is fixed relative to said ring-shaped element to provide a signal light reflected from said ring-shaped element, establishing a reference plane.

15. A sun tracking system for the control of an azimuthal-elevational heliostat, adapted to continuously reflect the rays of the sun onto a predetermined target, comprising:
  (a) an azimuthal-elevational heliostat with a flat mirror mounted upon it;
  (b) a first pair of reflector members in the shape of half-spheres, mounted separately along the top of the azimuthal axis of said heliostat such that their flat, non-reflecting back surfaces are parallel to each other and the azimuthal axis while making an angle of 90° with said flat mirror and their convex spherical surfaces face in opposite directions;
  (c) a second pair of reflector members in the shape of half-spheres, mounted separately along the top of the elevational axis of said heliostat at the center of rotation of said heliostat, such that their flat, non-reflecting back surfaces are parallel to each other and the elevational axis of said flat mirror and their convex spherical surfaces face in opposite directions;
  (d) a post located between said heliostat and the predetermined target;
  (e) four opaque housing units each being provided with a narrow opening located upon said post;

(f) four photosensors, one corresponding to each half-sphere reflector member, each photosensor being located within an opaque housing unit such that said photosensor lies in a straight line between its corresponding half-sphere reflector member and the predetermined target so that each photosensor can detect the rays of the sun reflected from its corresponding half-sphere reflector member; and (g) circuit means provided to utilize the combined output of said photosensors to locate the sun in the sky and to continuously move said flat mirror so as to reflect the rays of the sun onto the predetermined target.

16. A sun tracking system for the control of an azimuthal-elevational heliostat, adapted to continuously reflect the rays of the sun onto a predetermined target, comprising:

(a) an azimuthal-elevational heliostat with a flat mirror mounted upon it;

(b) a first ring-shaped reflector member mounted on the top of the azimuthal axis of said heliostat such that said ring-shaped reflector member is parallel to the azimuthal axis while perpendicular to said flat mirror;

(c) a first means being provided to rotate said first ring-shaped reflector member around the azimuthal axis of said heliostat at a predetermined frequency;

(d) a second ring-shaped reflector member mounted on the elevational axis of said heliostat at the center of the rotation of said heliostat, such that said ring-shaped reflector member is parallel to the elevational axis and said flat mirror;

(e) a second means being provided to rotate said second ring-shaped reflector member around the elevational axis of said heliostat at a predetermined frequency;

(f) a first pair of opaque housing units each being provided with a narrow opening, the first opaque housing unit located on the azimuthal axis and the second opaque housing unit located on the elevation axis of said heliostat;

(g) a first pair of photosensors, the first photosensor being located in said first opaque housing unit of said first pair of opaque housing units and the second photosensor being located in said second opaque housing unit of said first pair of opaque housing units;

(h) two reference lights, the first positioned on the azimuthal axis and the second positioned on the elevational axis, adapted to provide a signal of reflected light for each ring-shaped reflector member to establish a reference plane;

(i) a post located between said heliostat and the predetermined target;

(j) a second pair of opaque housing units, each being provided with a narrow opening located upon said post;

(k) a second pair of photosensors, the first photosensor corresponding to the first ring-shaped reflector member, the second photosensor corresponding to the second ring-shaped reflector member, each photosensor being located within an opaque housing unit of the second pair of opaque housing units such that said photosensors lie in a straight line between their corresponding ring-shaped reflector member and the predetermined target so that each photosensor can detect the rays of the sun reflected from its corresponding ring-shaped reflector member; and (l) circuit means provided to utilize the combined output of said photosensors to locate the sun in the sky and to continuously move said flat mirror so as to reflect the rays of the sun onto the predetermined target.

* * * * *